(12) United States Patent
Sunkavalli et al.

(10) Patent No.: US 11,443,412 B2
(45) Date of Patent: Sep. 13, 2022

(54) HIGH DYNAMIC RANGE ILLUMINATION ESTIMATION

(71) Applicant: Adobe Inc., San Jose, CA (US)

(72) Inventors: Kalyan Sunkavalli, San Jose, CA (US); Mehmet Ersin Yumer, San Jose, CA (US); Marc-Andre Gardner, Quebec (CA); Xiaohui Shen, San Jose, CA (US); Jonathan Eisenmann, San Francisco, CA (US); Emiliano Gambaretto, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 234 days.

(21) Appl. No.: 16/678,072

(22) Filed: Nov. 8, 2019

(65) Prior Publication Data

US 2020/0074600 A1    Mar. 5, 2020

Related U.S. Application Data

(62) Division of application No. 15/824,943, filed on Nov. 28, 2017, now Pat. No. 10,475,169.

(51) Int. Cl.
| | |
|---|---|
| *G06T 5/00* | (2006.01) |
| *G06T 9/00* | (2006.01) |
| *G06T 7/90* | (2017.01) |
| *G06T 1/00* | (2006.01) |
| *G06N 3/04* | (2006.01) |

(Continued)

(52) U.S. Cl.
CPC ........... *G06T 5/007* (2013.01); *G06N 3/0454* (2013.01); *G06N 3/082* (2013.01); *G06T 1/0007* (2013.01); *G06T 1/20* (2013.01); *G06T 7/90* (2017.01); *G06T 9/002* (2013.01); *G06T 2207/10024* (2013.01); *G06T 2207/10152* (2013.01); *G06T 2215/12* (2013.01)

(58) Field of Classification Search
None
See application file for complete search history.

(56) References Cited

U.S. PATENT DOCUMENTS

| | | |
|---|---|---|
| 2011/0199350 A1 | 8/2011 | Wilson |
| 2011/0279703 A1 | 11/2011 | Lee |
| 2014/0037165 A1 | 2/2014 | King et al. |

(Continued)

OTHER PUBLICATIONS

U.S. Appl. No. 15/824,943, filed Nov. 28, 2017, Allowed.

(Continued)

*Primary Examiner* — Leon Viet Q Nguyen
(74) *Attorney, Agent, or Firm* — F. Chau & Associates, LLC

(57) ABSTRACT

Systems and techniques for estimating illumination from a single image are provided. An example system may include a neural network. The neural network may include an encoder that is configured to encode an input image into an intermediate representation. The neural network may also include an intensity decoder that is configured to decode the intermediate representation into an output light intensity map. An example intensity decoder is generated by a multi-phase training process that includes a first phase to train a light mask decoder using a set of low dynamic range images and a second phase to adjust parameters of the light mask decoder using a set of high dynamic range image to generate the intensity decoder.

12 Claims, 12 Drawing Sheets

(51) Int. Cl.
*G06N 3/08* (2006.01)
*G06T 1/20* (2006.01)

(56) References Cited

U.S. PATENT DOCUMENTS

| | | | |
|---|---|---|---|
| 2015/0228098 | A1 | 8/2015 | Kelley et al. |
| 2017/0169313 | A1 | 6/2017 | Choi et al. |
| 2017/0359534 | A1 | 12/2017 | Li et al. |
| 2018/0247153 | A1 | 8/2018 | Ganapati et al. |
| 2018/0260975 | A1 | 9/2018 | Sunkavalli et al. |
| 2019/0075301 | A1* | 3/2019 | Chou .................. H04N 19/132 |
| 2019/0080440 | A1* | 3/2019 | Eriksson ................. G06N 5/00 |
| 2019/0096046 | A1* | 3/2019 | Kalantari .................. G06T 5/50 |

OTHER PUBLICATIONS

Barron, Jonathan T., et al., "Shape, illumination, and reflectance from shading", Technical Report No. UCB/EECS-2013-117, http://www.eecs.berkeley.edu/Pubs/TechRpts/2013/EECS-2013-117.html, May 29, 2013, 22 pages.

Clevert, Djork-Arné, et al., "Fast and accurate deep network learning by exponential linear units (elus)", arXiv preprint arXiv:1511.07289v5, Feb. 22, 2016, 14 pages.

Gardner, Marc-André, et al., "Learning to Predict Indoor Illumination from a Single Image", arXiv preprint arXiv:1704.00090v2, May 25, 2017, 13 pages.

Georgoulis, Stamatios, et al., "What Is Around The Camera?", downloaded from https://arxiv.org/pdf/1611.09325v2.pdf, Aug. 1, 2017, 9 pages.

He, et al., "Deep Residual Learning for Image Recognition", IEEE Conference on Computer Vision and Pattern Recognition (CVPR), Las Vegas, NV, 2016, pp. 770-778.

Ioffe, Sergey, et al., "Batch normalization: Accelerating deep network training by reducing internal covariate shift", International Conference on Machine Learning, Jul. 7-9, 2015, 9 pages.

Karsch, Kevin, et al., "Automatic Scene Inference for 3D Object Compositing", ACM Transactions on Graphics, vol. 28, No. 4, Article 106, Publication date: Aug. 2009, 14 pages.

Kingma, Diederik, et al., "Adam: A method for stochastic optimization", arXiv preprint arXiv:1412.6980v9, Jan. 30, 2017, 15 pages.

Lalonde, Jean-François, et al., "Estimating Natural Illumination from a Single Outdoor Image", School of Computer Science, Carnegie Mellon University, downloaded from http://repository.cmu.edu/cgi/viewcontent.cgi?article=1788&context=robotics, Oct. 2009, 9 pages.

Rematas, Konstantinos, et al., "Deep reflectance maps", In Proceedings of the IEEE Conference on Computer Vision and Pattern Recognition, Jun. 2016, pp. 4508-4516.

Srivastava, Nitish, et al., "Dropout: A Simple Way to Prevent Neural Networks from Overfitting", Journal of Machine Learning Research 15, Published Jun. 2014, pp. 1929-1958.

\* cited by examiner

HIGH DYNAMIC RANGE ILLUMINATION ESTIMATION

CROSS-REFERENCE TO RELATED APPLICATION

This application is a divisional application and claims the benefit of U.S. application Ser. No. 15/824,943, filed on Nov. 28, 2017 and titled "HIGH DYNAMIC RANGE ILLUMINATION ESTIMATION", all of which is incorporated herein by reference in its entirety.

BACKGROUND

When using graphics applications, users often desire to manipulate an image by compositing objects into the images or performing scene reconstruction or modeling. To be effective and provide realistic results, these processes depend on recovering the illumination that contributes to the original image. Traditional methods of recovering illumination have been limited to illumination directly visible from the actual image. Such methods do not always provide a realistic illumination recovery because images often represent only a portion of the environment in which the scene resides, and the illumination of a scene may be formed by light sources that are not directly visible within an image itself. For example, many standard images provide a limited view, such as approximately a 60-degree view to a 90-degree view, while the entire 360-degree environment may include light sources illuminating the scene but that are outside that limited view shown in the image.

There are existing methods for estimating illumination from an entire panoramic environment, but they lack the robustness to be generally applicable to many indoor scenes. For example, current methods for recovery of outdoor scenes infer sky illumination and do not work for images of scenes with other types of illumination, such as indoor scenes. Additionally, there are data-driven approaches for indoor scenes that compare the illumination of an input image to known environment maps and determine the closest estimation between the known environment maps and the image. Such an approach, however, assumes that there will be a close estimate to the actual environment of the input image that is stored in the database of known environments. Considering the wide variety of illumination that occurs in indoor scenes, this assumption may not always hold true.

Further, other methods utilize deep learning methods to recover reflectance maps, but these methods are based on a small amount of data and many assumptions that limit applicability of these methods. For instance, current deep learning methods for estimating illumination can be used only for images having a predefined object of a certain class. The predefined object must be at or near the center of the captured scene and must be segmented from the background. Such strong assumptions limit the use of these methods to a very narrow class of images.

More recently, neural networks, including deep neural networks, have been used in estimating illumination from a single image. These neural network-based techniques have been used to generate light masks, which correspond to a probability that a light source exists at a particular location. These techniques do not estimate an intensity of light and, thus, present challenges to the generation of high dynamic range (HDR) images. Accordingly, current systems and techniques do not provide accurate or robust methods for estimating illumination intensity of a panoramic environment for a single image of an indoor scene.

In general, neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network.

Each neural network is trained for a specific task, e.g., image upscaling, prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

SUMMARY

According to one general aspect, systems and techniques for estimating illumination from a single image are provided. An example system may include a neural network. The neural network may include an encoder that is configured to encode an input image into an intermediate representation. The neural network may also include an intensity decoder that is configured to decode the intermediate representation into an output light intensity map. An example intensity decoder is generated by a multi-phase training process that includes a first phase to train a light mask decoder using a set of low dynamic range images and a second phase to adjust parameters of the light mask decoder using a set of high dynamic range image to generate the intensity decoder.

Another general aspect is a system for compositing content with an image. The system may include at least one memory including instructions and at least one processor that is operably coupled to the at least one memory and that is arranged and configured to execute instructions that, when executed, cause the at least one processor to implement an application. The application may include a user interface configured to receive an image and an input to identify content to insert into the image. The application may also include a neural network configured to receive the image and generate illumination data that includes light intensity information for the image. The application may also include a rendering engine configured to render the identified content over the input image using the illumination data to generate a composite image and output the composite image for display on the user interface.

Another general aspect is a computer-implemented method for training a neural network to estimate illumination of images. The method includes receiving low dynamic range training panoramic images and extracting a first set of training patches from the low dynamic range training panoramic images. Each training patch of the first set of training patches is a portion of a low dynamic range training panoramic image. The method also includes generating training recovery light masks for the first set of training patches using a neural network system. Each training recovery light mask indicates a probability of each pixel of a corresponding training panoramic image being a light source. The method further includes, based on comparisons of training light recovery masks to reference masks, training the neural network system to synthesize light recovery masks for input images. Additionally, the method includes receiving high dynamic range training panoramic images and extracting a second set of training patches from the high dynamic range training panoramic images, each training patch of the second set of training patches being generated from a portion of a high dynamic range training panoramic image. The method also includes generating training light intensity maps for the second set of training patches using the neural network system. Each training light intensity map indicates an estimated light intensity of each pixel of a corresponding high dynamic range training panoramic image. The method also includes, based on comparisons of training light intensity maps to reference light intensity maps, training the neural network system to synthesize light intensity maps for input images.

The details of one or more implementations are set forth in the accompanying drawings and the description below. Other features will be apparent from the description and drawings, and from the claims.

DETAILED DESCRIPTION

Figure 1:
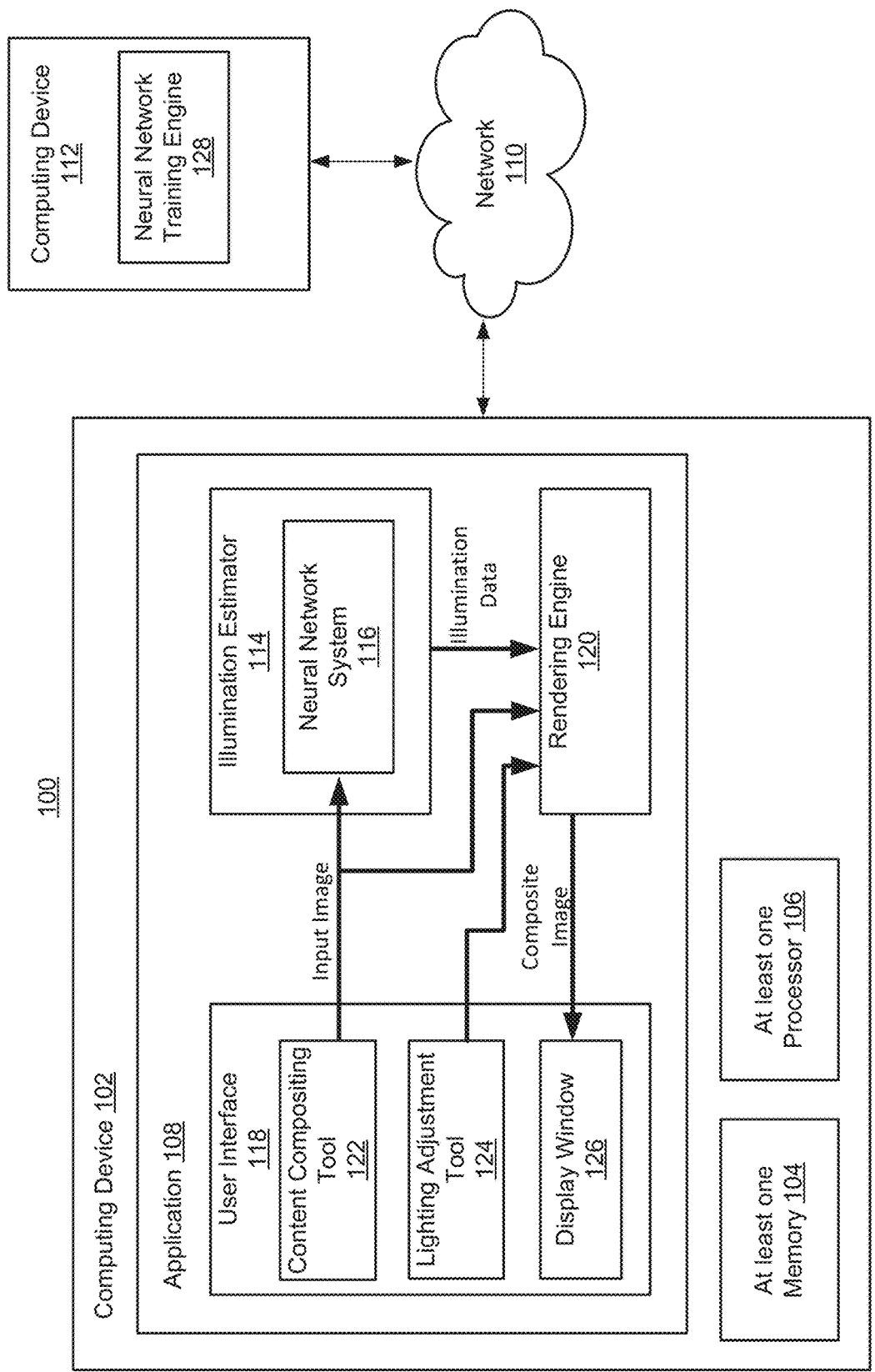
FIG. 1 is a block diagram of a system for estimating illumination of an image using a neural network.

This description relates to illumination estimation. In some implementations, illumination estimation may be performed from a single image using a neural network. Illumination estimation may include estimating intensity and/or hue of illumination.

Users may desire to modify an image by inserting objects into the image. The image may be a static image read from a memory device or may be a frame from a video feed captured by a camera. The inserted object may include an image or three-dimensional (3D) model. By inserting objects, a user can, for example, generate a composite image or augmented reality (AR) environment.

When compositing objects into an image, it is important to light the objects appropriately for the image to achieve a realistic appearance. Additionally, for scene reconstruction and modelling (e.g., based on estimating the geometric structure of the scene captured in the image), an estimation of the illumination is often required to produce accurate geometry. Accordingly, an understanding of the illumination affecting the original input image is important.

Sources of illumination are not always directly visible in the image itself, yet those sources may play a role in the overall illumination. For instance, the angle of view is a measure of the angular extent to which a given scene is imaged by a camera and, with a standard lens, will often be no more than 100 degrees. There may be sources of light, such as a lamp or window, that are outside of the angle of view of an image but that nonetheless contribute to the illumination of the image. Accordingly, an accurate estimation of illumination for a single image involves estimating illumination for an entire 360-degree environment that includes but is greater than the portion captured in the image.

The systems and techniques described herein facilitate accurate illumination estimation of a panoramic environment based on a single image depicting a portion of that environment. Illumination estimation may be accomplished through generation of light intensity maps and, in some implementations, environment maps that provide directional ambient color, which may be represented in low-dynamic range (LDR) Red-Green-Blue (RGB) format images, for each input image. An input image may, for example, be a single image depicting less than 360 degrees of the environment in which the image is taken. An input image may be any image, such as an RGB image and, in some implementations, is a low-dynamic range image, such as a Joint Photographic Experts Group (JPEG) format image file. In other implementations, the input image is a high-dynamic range (HDR) image. A panoramic environment may be an environment that includes and is larger than the scene, such as an indoor scene, depicted in the input image. In some implementations, the panoramic environment includes a 360-degree view, but the panoramic environment may also include a view less than 360 degrees but larger than the view captured in the input images. In some implementations, the light intensity map and environment map are 256×128 images.

The light intensity map may include an image corresponding to the panoramic environment, where the value of each pixel of the image represents the estimated intensity of light emanating from the corresponding location of the panoramic environment. For example, the light intensity map may store a logarithmic value corresponding to the light intensity. The environment map may be an image that indicates information, such as an estimation of color distribution that depicts general locations of different colors and semantic distinctions between walls, floors, ceilings, and the like. The environment map may be a low-frequency image that represents a coarse estimation of the information. The light intensity map and the environment map for an input image represent a plausible panoramic environment, not just the narrow view of the scene captured in the input image. In this regard, the light intensity map and environment map provide illumination information inferred from the input image but that is not directly visible in the input image.

At a high level, realistic illumination intensity estimations can be generated by a neural network system. As described herein, a neural network system, such as an illumination intensity estimation neural network system, can be trained using at least one neural network within the system. In such a system, a neural network can be trained to infer, from a single input image, an estimation of the illumination intensity of an environment that includes a scene depicted in the input image and can generate output representing that estimation. Although generally described as one neural network, any number of neural networks can be trained in accordance with embodiments described herein.

The neural network may be part of a dual-branch network architecture. The network architecture utilizes an encoder stage to encode an input image, such as a jpeg image file, into an intermediate representation. In some implementations, the intermediate representation includes 1024 floating point values. After encoding into the intermediate representation, the network is divided into two branches operating from the same intermediate representation. One such branch generates a light intensity map from the intermediate representation while the other branch creates an environment map.

In training the neural network to estimate illumination for a single image, training images are used as training input. The training images may be, for example, extracted from larger panoramic images. In addition to being used to generate training images, the panoramic images may also be used as reference images or to generate references. A reference, also known as a ground truth, may be compared to the output of the neural network system to help train the neural network. For the environment maps, the panoramic images themselves may be used as reference images and compared to the environment maps output by the system, while reference light intensity maps are used as references to compare with the light intensity maps that are generated. The reference light intensity maps may be created from the panoramic images associated with training images too. For example, in some implementations, these reference light intensity maps are based on a logarithm value of the luminance of each pixel within a panoramic environment encompassing the training image.

Training the neural network may require a large number of training images. Because the required number of training images may not be available as HDR panoramic images, some implementations use a multi-phase training process. For example, some implementations perform a first phase of training for generating recovery light masks and environment maps using a larger set of LDR training images and then perform a second phase of training to refine the generation of the recovery light mask into generation of a light intensity map using a smaller set of HDR training images. A recovery light mask may include an image mask indicating probabilities of whether each pixel in the mask is a light source.

In some implementations, the larger set of LDR training images may include an order of magnitude more training images than the smaller set of HDR training images. In this manner, the neural network can be trained to generate light intensity maps using a smaller set of HDR training images than would otherwise be possible.

In some implementations, during the first phase of training, the environment maps and the recovery light masks generated by the neural network are compared to the associated LDR panoramic images and reference binary light masks generated therefrom, respectively, to determine errors between the output of the neural network system and the references. During the second phase of training, the environment maps and the light intensity maps generated by the neural network are compared to the associated HDR panoramic images and luminosity values of those panoramic images, respectively, to determine errors between the output of the neural network system and the references.

In both training phases, the determined errors are then fed back through the neural network system to appropriately train the neural network, for example, by adjusting the weight of the network connections to reduce the value of the errors. This process can be repeated for a sufficiently large number of training cycles until the neural network system converges to a state where the error of the calculations is small enough such that the output environment maps and recovery light masks, in the first phase, or light intensity maps, in the second phase, reach a desired threshold level of similarity to the references. At the beginning of the second phase, the neural network may be trained to produce a recovery light mask (e.g., in which each pixel represents a probability of a light source existing at the corresponding location in the panoramic image). Nonetheless, the output of the neural network may be treated as an light intensity map (e.g., the pixel values will be treated as logarithmic intensity values) during the second phase and the previously described training process will refine the neural network to generate better light intensity maps that more closely correspond to the references. Because the light masks and intensity maps are correlated, the first phase of training to generate recovery light masks gives the neural network a head start in the second phase of training to generate light intensity maps.

Additionally, some implementations generate one or more discrete light sources are identified from the output of the neural network. For example, an adaptive thresholding operator may be applied to the light intensity maps. Advantageously, because the thresholding operator is adaptive, the threshold operator can adapt to both lighter scenes and darker scenes. In some implementations, once potential lights have been identified using the adaptive threshold operator, an adaptive non-maximum suppression operator is applied to remove some lights that are too close to other lights, keeping only the most prominent lights. These discrete lights can then be used, for example, by a rendering engine.

Additionally, some implementations generate a reduced neural network model after the training is complete. In one example, the reduced network includes approximately 9 million weight parameters as compared with 50 million weight parameters in the original network model. The reduced model may reduce the amount of memory required to store and use the model. Additionally, the reduced network model may use fewer processor cycles to generate the environment maps and/or light intensity maps. The reduced neural network may be used, for example, on a mobile computing device such as a smartphone.

The systems and techniques described in this document relating to estimating illumination significantly improve the quality of illumination estimates from a single image. Additionally, the techniques allow for estimating HDR illumination, including estimating intensity of illumination.

FIG. 1 is a block diagram of a system 100 for estimating illumination for an image. The system 100 includes a computing device 102 having at least one memory 104, at least one processor 106, and at least one application 108. The computing device 102 may communicate with one or more other computing devices over a network 110. For instance, the computing device 102 may communicate with a computing device 112 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. Additionally, the at least one processor may include one or more central processing units (CPUs) and/or one or more graphics processing units (GPUs). In some implementations, the at least one memory 104 includes a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the application 108 and its components used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 110. In one implementation, the application 108 may be an image editing application or application that includes features and functionality to enable image editing and/or image manipulation. The image editing application may be a standalone application that runs on the computing device 102. Alternatively, the image editing application may be an application that runs in another application such as a browser application. The image editing application enables a user to edit and manipulate images. As another example, the application 108 may be an augmented reality (AR) application that composites content over images captured by a camera of the computing device 102 to generate an augmented environment.

The application 108 enables a user to insert or composite content into an image. Additionally or alternatively, the application 108 may enable a user to composite content into a video. The application 108 includes an illumination estimator 114 that is configured to estimate illumination for an image based on properties of the image. The illumination estimator 114 may include a neural network system 116. The neural network system 116 may include one or more neural networks, such as convolution neural networks, that are trained to estimate HDR illumination data for an input image. The input image may be an HDR image that represents a portion of an indoor scene and has an angle of view of 100 degrees or less. In at least some implementations, the estimated HDR illumination data includes a light intensity map for a region larger than the scene captured in the image (e.g., the estimated HDR illumination data may correspond to a 360 degree panoramic scene). The HDR illumination data may also include color data such as an environment map representing the larger region. For example, the neural network system 116 may include a dual-headed neural network, having a first head for generating light intensity maps and a second head for generating corresponding color images. In some implementations, the neural network system 116 includes a single head that generates an output that combines the light intensity map and the color data. Additionally, some implementations include additional heads, such as a third head that is trained to predict surface normal vectors for the scene captured by the image.

Figure 2:
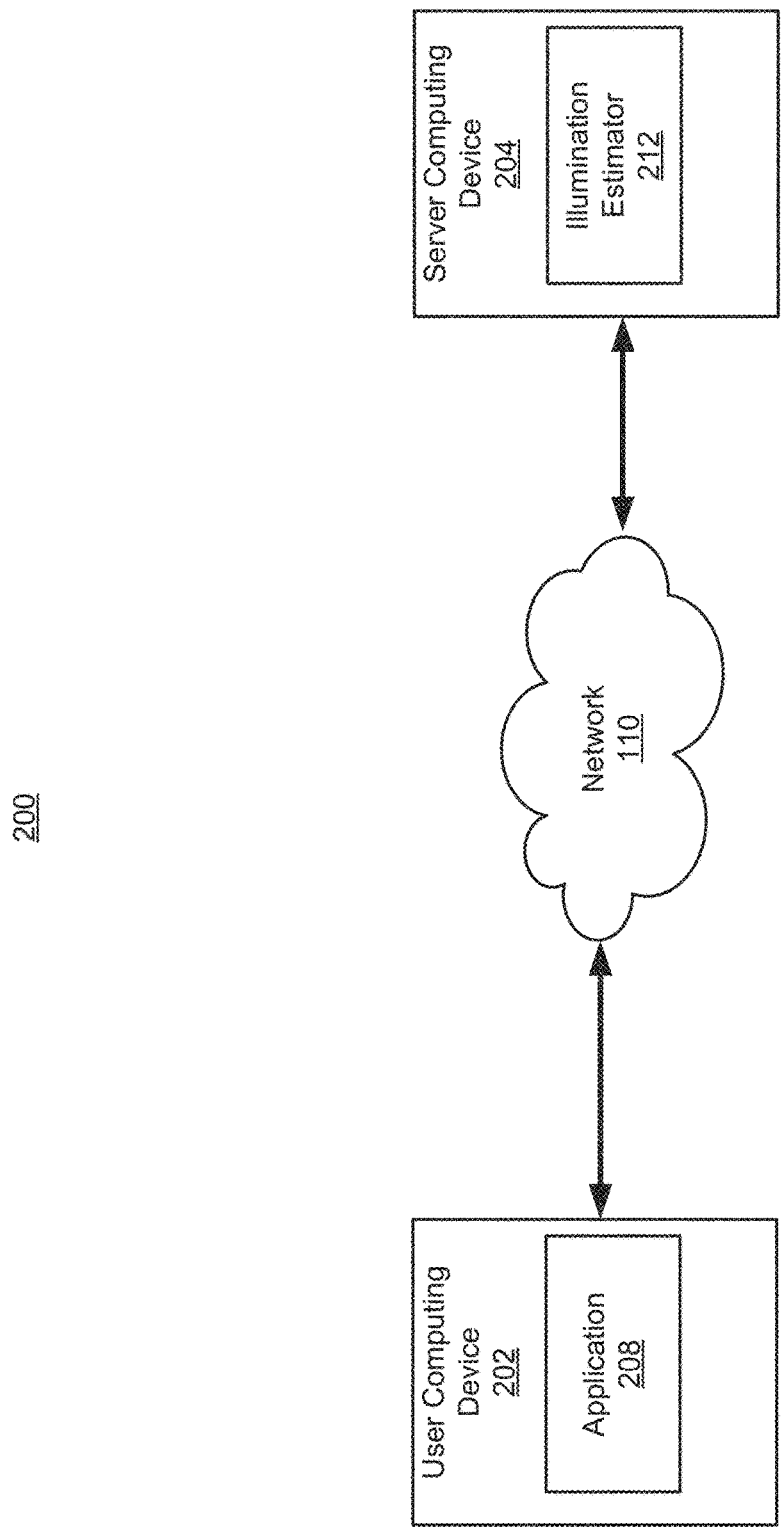
FIG. 2 is a schematic diagram of an embodiment of the system for estimating illumination.

Although in FIG. 1, the illumination estimator 114 is shown as a component of the application 108, the illumination estimator can also be separate from the application. For example, FIG. 2 shows an implementation in which a user computing device 202 includes an application 208 that communicates over the network 110 with an illumination estimator 212 provided by a server computing device 204. For example, the server computing device 204 may provide a network-based illumination estimation service. The user computing device 202 may transmit an input image to the server computing device 204 and receive corresponding illumination data generated by the illumination estimator 212.

Returning now to FIG. 1, the application 108 also includes a user interface 118 and a rendering engine 120.

The user interface may include a content compositing tool 122, a lighting adjustment tool 124, and a display window 126. The user interface 118 may include other elements and components, such as other tools used for image editing and image manipulation and graphic design for use as part of the application 108, which are not described here but which also form a part of the application 108. For instance, the user interface 118 may include a work area to create a design using text and images as well as many tools and layers that may be used to create the design in the work area.

The user interface 118 may access images from the at least one memory 104 or from other storages locations either locally on computing device 102 or remotely on other computing devices accessed across the network 110. The user interface 118 may provide an input image to the illumination estimator 114 and, more specifically, to the neural network system 116. For example, the content compositing tool 122 may allow a user to select content, an image, and position within the image to insert the content. The content may include a three-dimensional (3D) model and the content compositing tool may allow the user to position, scale, and rotate the content. An accurate estimation of the illumination of the scene captured in the image may be used to ensure the content is inserted in the image in a realistic manner.

The neural network system 116 may generate illumination data for the input image, such as an illumination intensity map. The illumination intensity map may for example include a panoramic environment map with pixel values that represent the estimate intensity of light emanating from a corresponding position surrounding the scene in the input image. In some implementations, the illumination estimator 114 may also generate color information for the panoramic environment surrounding the captured scene. For example, the color information may correspond to the estimated color of light emanating from various locations in the environment. The color information may be combined with the light intensity map or may be provided as a separate light color image, such as an environment map. In some implementations, the illumination estimator 114 may normalize the illumination data to fit a predetermined distribution pattern.

In some implementations, the illumination estimator 114 uses the intensity map to generate discrete light sources. Illumination data, such as an intensity map and/or discrete light source properties, may then be provided to the rendering engine 120. This illumination data may then be used by the rendering engine 120 to render the content over the input image to generate a composite image. The user interface 118 may then display the composite image using the display window 126.

The neural network system 116 may first be trained before being incorporated as part of the application 108. For example, the neural network system 116 may include a multi-layer convolution neural network (CNN) that includes multiple parameters that are adjusted during a training process. For example, in some implementations, the neural network system 116 includes approximately 50 million parameters that have been adjusted during a training process to generate illumination data.

Training the neural network may be time-consuming and use a significant amount of system memory and processing cycles. Additionally, training the neural network may require access to a large corpus of training data. For example, the corpus may include thousands, tens of thousands, or even more training images. In one implementation, the neural network may be trained using a different computing device, such as computing device 112, which includes a neural network training engine 128.

Figure 3:
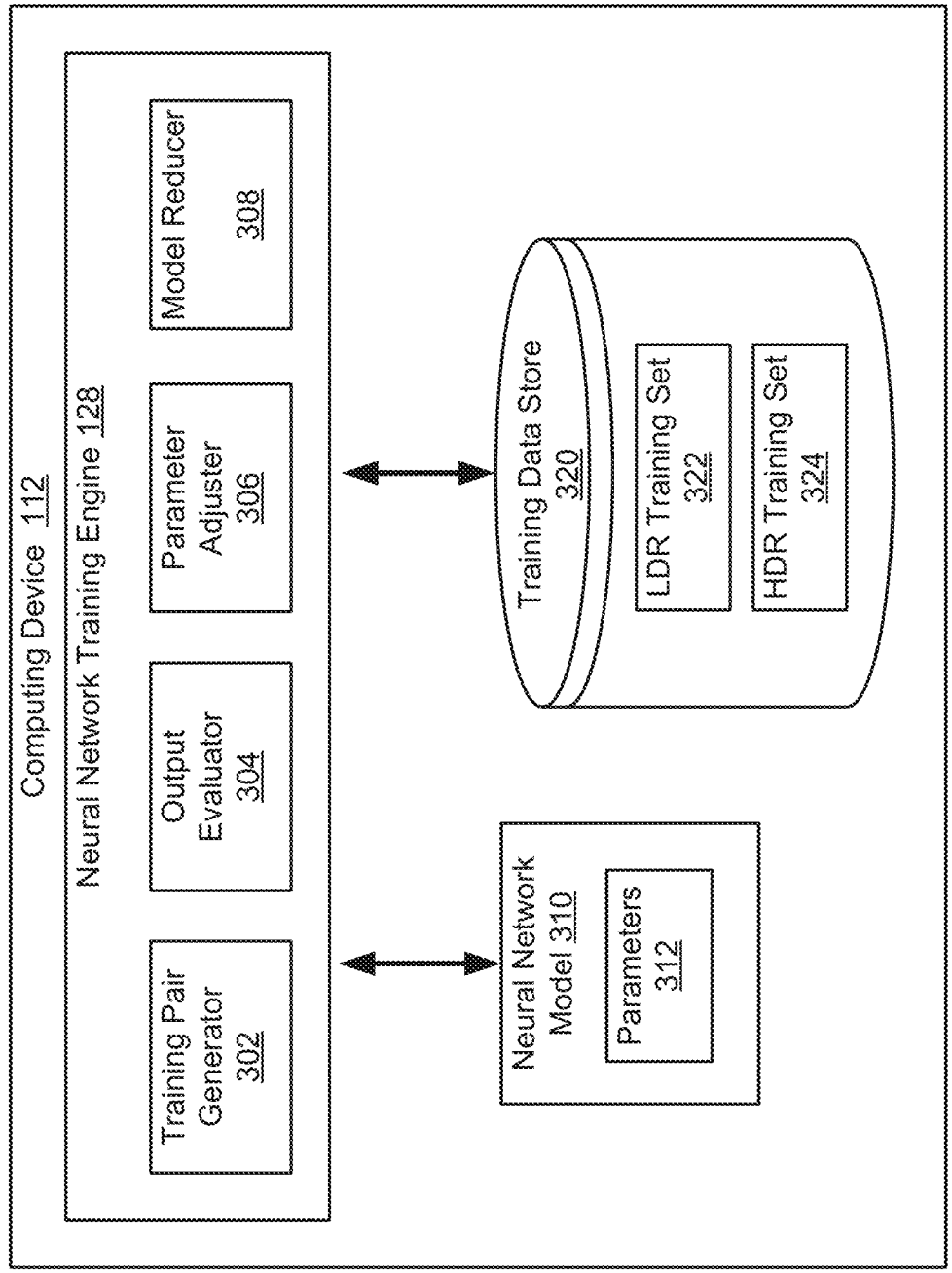
FIG. 3. is a schematic diagram of an embodiment of the neural network training engine of FIG. 1.

Referring to FIG. 3, an example of the computing device 112 and the neural network training engine 128 are shown. In this example, the neural network training engine 128 includes a training pair generator 302, an output evaluator 304, and a parameter adjuster 306. In this example, the computing device 112 also includes a neural network model 310 and a training data store 320. The neural network model 310 may be trained by the neural network training engine 128. The neural network model 310 includes parameters 312, which may be adjusted during the training process. After training, the neural network model 310 model may be transmitted to the computing device 102 for use in the neural network system 116.

The training data store 320 stores a training corpus of training data for training the neural network model 310. As described further below, the corpus of training data may be divided into a larger LDR training set 322 of LDR panoramic images and a smaller HDR training set 324 of HDR panoramic images. For example, the LDR training set 322 may include an order of magnitude more panoramic images than the HDR training set 324.

In some implementations, the training pair generator 302 may generate training patches from LDR and HDR panoramic images stored in the LDR training set 322 and the HDR training set 324, respectively. For example, the training pair generator 302 may extract a portion of a panoramic image for use as a training patch. The training patches may include a portion of the panoramic image having a smaller field of view, such as a 90-100 degree field of view. In some implementations, several different training patches are extracted from a single panoramic image. Additionally, in some implementations, an LDR training patch is generated from a portion of an HDR panoramic image (e.g., by converting the representation of the pixels in the portion from an HDR format to an LDR format).

Figure 5:
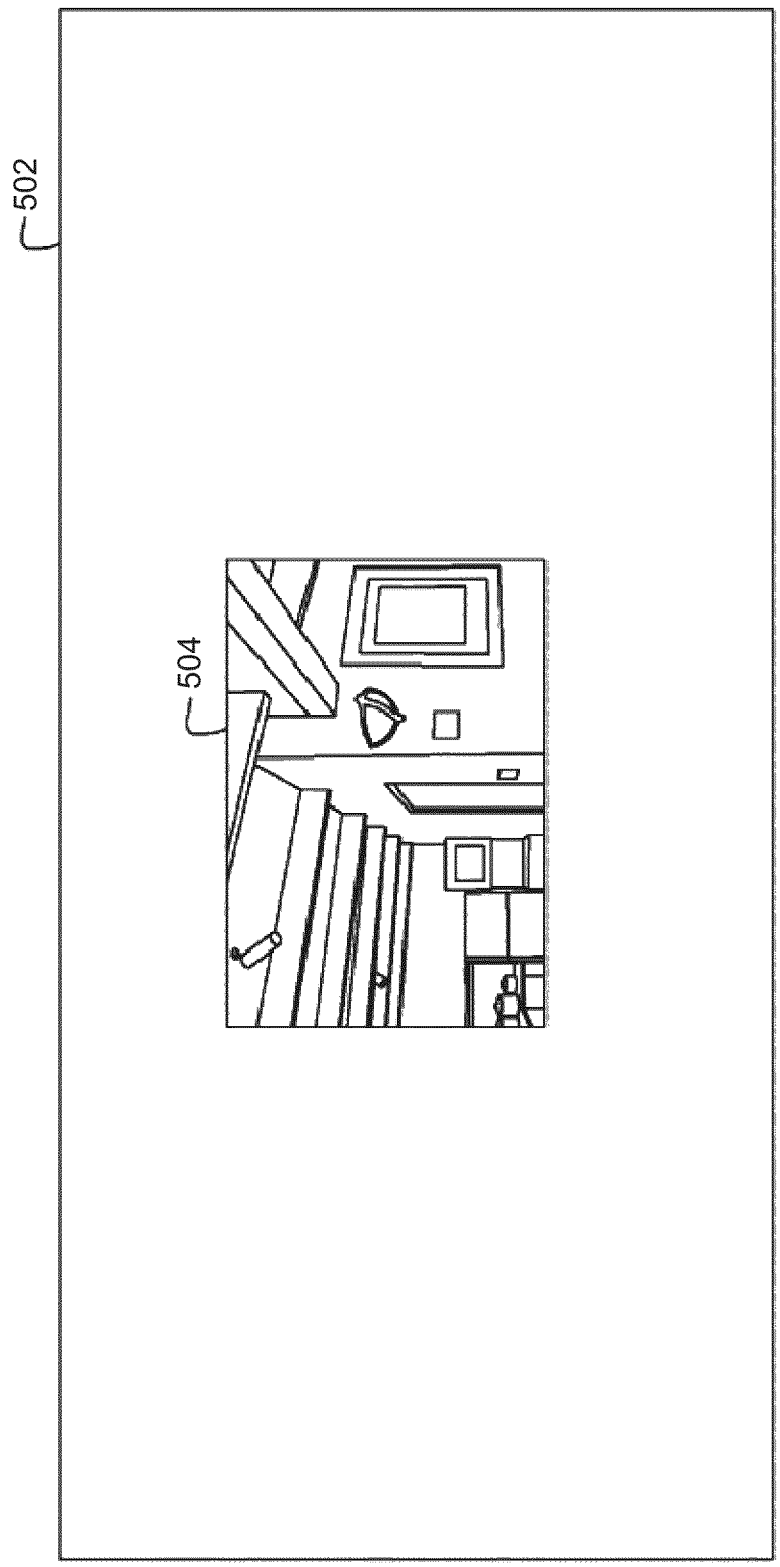
FIG. 5 is a schematic diagram of an example training patch, in accordance with implementations provided herein.

The neural network training engine 128 may perform a first phase of neural network training using a first set of training patches generated from LDR panoramic images stored in the LDR training set 322 to train the neural network model 310. FIG. 5 shows an example of a training patch 504 that is extracted from a larger panoramic image 502. For purposes of clarity, the imaged scene is depicted only in the training patch 504 and not in the surrounding panoramic image 502; however, it should be understood that the panoramic image 502 would depict portions of the scene extending out from what is shown in the training patch 504.

Figure 6:
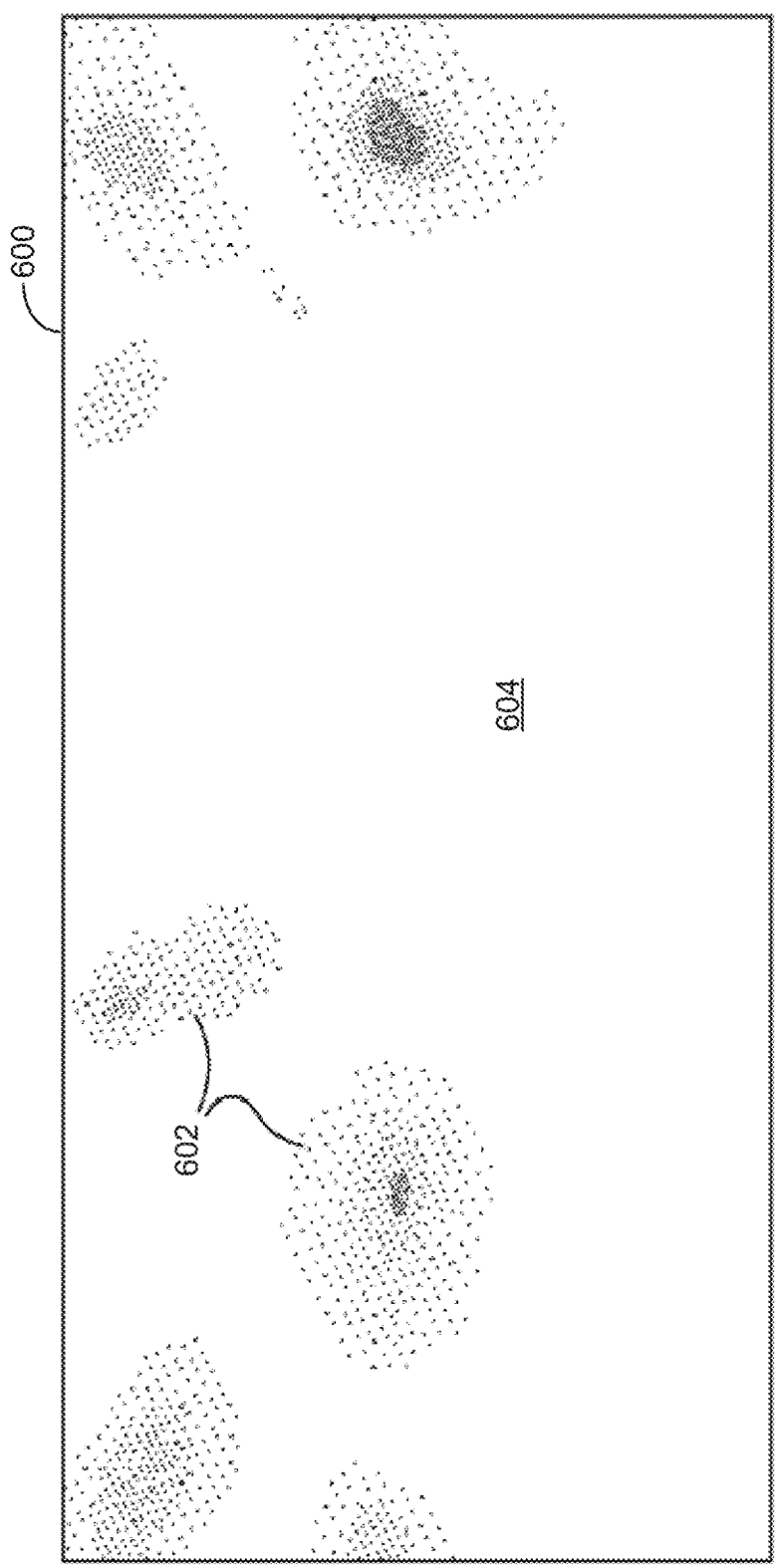
FIG. 6 is a schematic diagram of an example recovery light mask, in accordance with implementations provided herein.

The first set of training patches may be provided as input images to the neural network model 310, which will then generate a corresponding training output. For example, during the first phase, the training output may include recovery light masks and environment maps generated from an input image. An example recovery light mask 600 is illustrated in FIG. 6. The recovery light mask 600 may have been generated for an input image, such as the training patch 504 illustrated in FIG. 5. The recovery light mask 600 may provide indicators of possible light sources, such as possible light sources 602. The recovery light mask 600 represents the entire panoramic environment, such as that shown in the panoramic image 502 of FIG. 5, and indicates probabilities that each pixel within that panoramic environment is a light source. For clarity, the different degrees of probabilities are illustrated in FIG. 6 by differing stippling densities. The low density or absence of stippling in recovery light mask 600 represents areas with little to no probability of being a light source (e.g., low probability region 604) while areas of more concentrated stippling indicate higher probabilities (e.g., possible light sources 602). The output environment map may represent the entire panoramic environment and indicates an inferred color for each pixel within that panoramic environment.

The output evaluator 304 may then evaluate the training output against a reference output (e.g., a desired output generated from the LDR panoramic image associated with the training patch) to generate an output evaluation (e.g., data quantifying and/or representing differences between the training output and the reference output).

Figure 7:
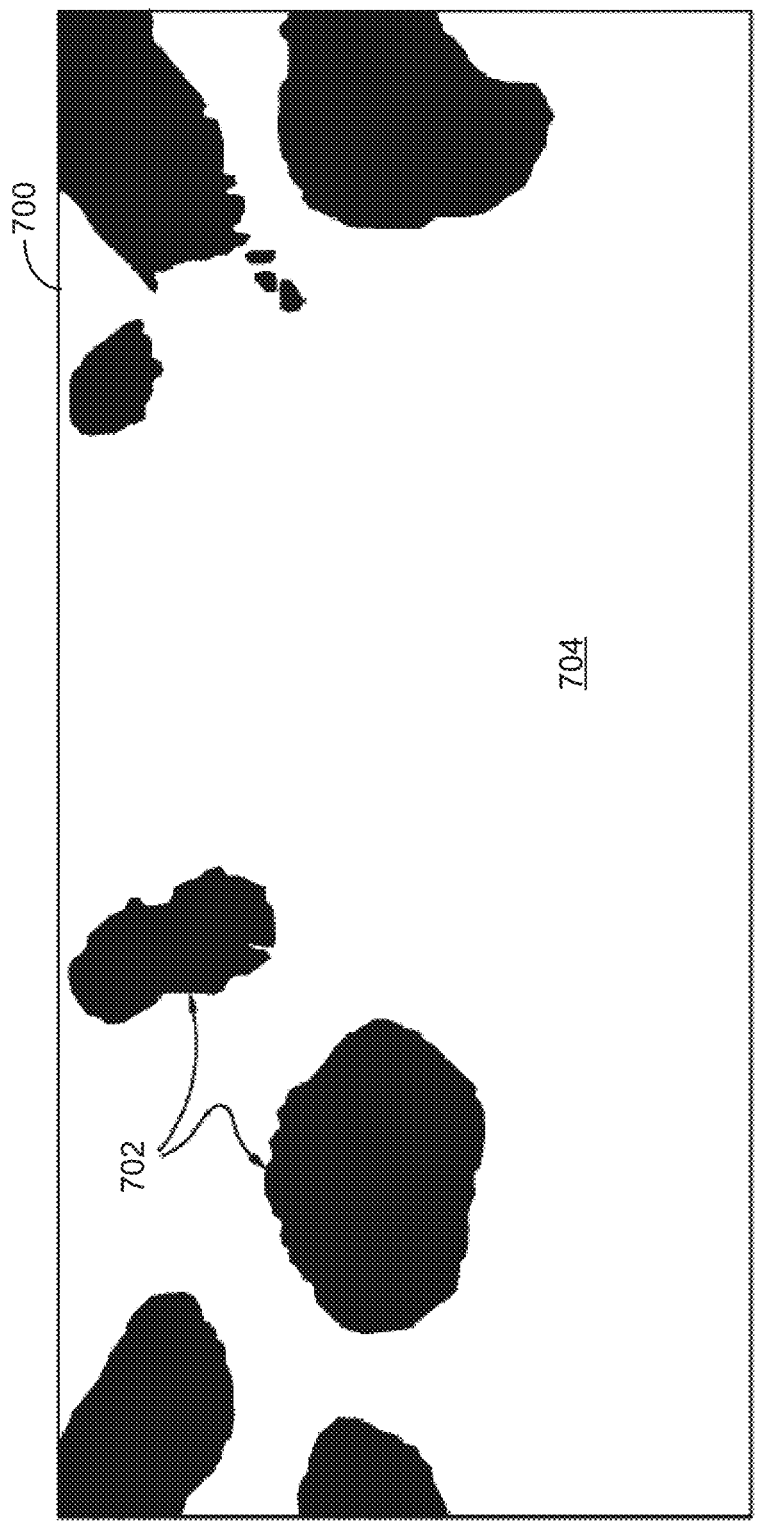
FIG. 7 is a schematic diagram of an example reference light mask, in accordance with implementations provided herein.

The reference output may include a reference light mask and a reference environment map generated from the associated panoramic image. An example reference light mask 700 is depicted in FIG. 7. Reference light mask 700 of FIG. 7 may have been generated from the panoramic image 502 of FIG. 5. Accordingly, reference light mask 700 may be used as a reference for comparison to a recovery light mask generated from the training patch 504, such as the recovery light mask 600 of FIG. 6. The different classes represented by the mask (i.e., a pixel that is classified as a light source and a pixel that is classified as not a light source) are indicated with different values. In this example, black regions of the image represent pixels that are classified as being a light source, such as light sources 702, while white regions represent pixels that are classified as not being a light source, such as non-light-source area 704. Although this example shows a reference light mask with binary values, in some implementations, light masks with other types of values, such as probabilities, are used. In some implementations, the associated panoramic image is used as the reference environment map.

Based on the output evaluation, the parameter adjuster 306 adjusts the parameters 312 of the neural network model 310 to reduce the difference between the training output of the neural network model 310 and the reference output. In this manner, the first phase of training may train the neural network model 310 to produce output recovery light masks and environment maps from an input image (e.g., a non panoramic image).

After the first training phase, the neural network training engine 128 may perform a second phase of neural network training using a second set of training patches generated from HDR panoramic images stored in the HDR training set 324 to adjust the neural network model 310. The second set of training patches can be generated in a similar manner to the first set of training patches. In some implementations, the second set of training patches are generated by converting patches extracted from the HDR panoramic images to an LDR format.

Figure 8:
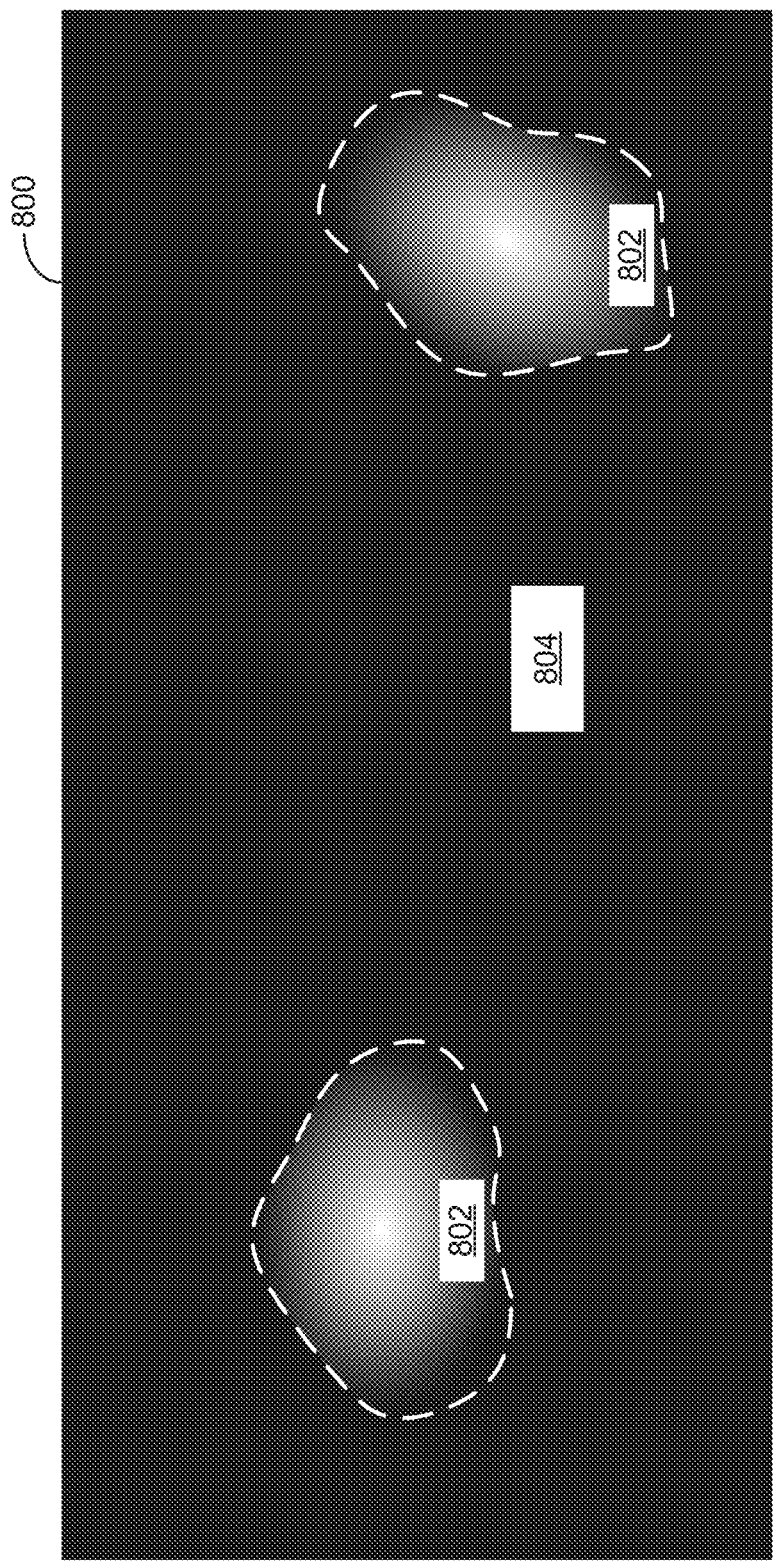
FIG. 8 is a schematic diagram of an example light intensity map, in accordance with implementations provided herein.

The second set of training patches may then be provided as input images to the neural network model 310, which will then generate corresponding training outputs. For example, during the second phase, the training output may include light intensity maps and environment maps generated from an input image. An example light intensity map 800 is illustrated in FIG. 8. The light intensity map 800 may have been generated for an input image, such as a training patch similar to the training patch 504 illustrated in FIG. 5. The light intensity map 800 may provide indicators of light intensity emanating from the panoramic environment surrounding the training patch. The light intensity map 800 represents the entire panoramic environment, such as that shown in the panoramic image 502 of FIG. 5, and indicates the intensity of light emanating from each pixel within that panoramic environment. For clarity, FIG. 8 presents a simplified scene that includes two regions 802 that are emanating light surrounded by a non-light region 804. In this example, the lightness of the pixels corresponds to the intensity of the light in the corresponding portion of the panoramic environment. In some implementations, the light intensity value is represented using a logarithmic scale.

Similar to the first phase, the output evaluator 304 may then evaluate the training output against a reference output (e.g., a desired output generated from the HDR panoramic image associated with the training patch) to generate an output evaluation (e.g., data quantifying and/or representing differences between the training output and the reference output). The reference output may include a reference light intensity map and a reference environment map generated from the associated panoramic image. The reference light intensity map may be similar to the reference light mask 700 depicted in FIG. 7, except that the pixels of the reference light intensity map represent an intensity value of the panoramic environment. In some implementations, the reference light intensity map is generated from the luminosity values of an HDR panoramic image. And similar to the first phase, the associated panoramic image may be used directly as the reference environment map.

Based on the output evaluation, the parameter adjuster 306 adjusts the parameters 312 of the neural network model 310 to reduce the difference between the training output of the neural network model 310 and the reference output. In this manner, the second phase of training may tune the neural network model 310 to produce output light intensity maps rather than recovery light masks from an input image.

In some implementations, after the second training phase, the model reducer 308 reduces the parameters 312 in the neural network model 310 so as to reduce the size of the neural network model 310 and the processing cycles needed to apply the neural network model 310 to an input image. For example, the model reducer 308 may reduce the number of parameters in the parameters 312 from approximately 50 million down to less than 10 million. In some implementations, the number of parameters is reduced in a manner that minimizes the impact on the performance of the neural network model 310. For example, the performance of the neural network model 310 after the parameters 312 are reduced by the model reducer 308 may be within 90% of the output of the neural network model 310 before reduction. In some implementations, neurons and/or layers are removed from the model and the impact on the output is evaluated. A number of neurons/layers that do not have a significant impact on the output may be removed to generate the reduced model. Additionally or alternatively, a smaller network model (i.e., one that has fewer parameters) is trained from scratch using the training process and loss function that was tuned for the larger model (i.e., the one with more parameters).

Figure 4B:
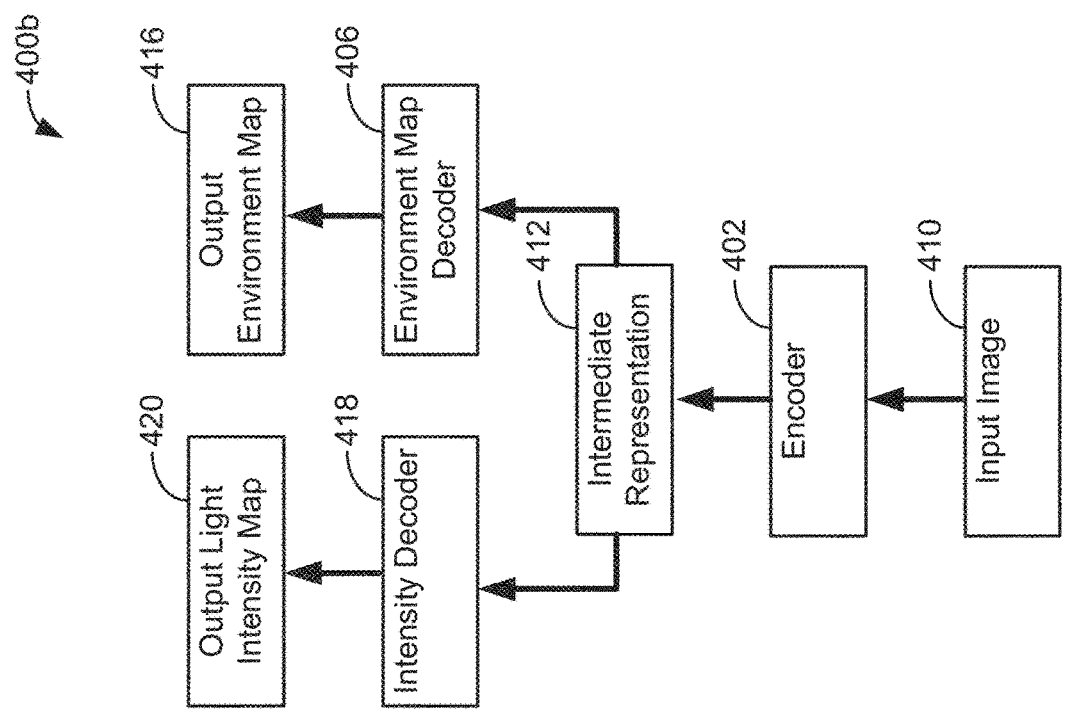
FIG. 4a and FIG. 4b are schematic diagrams of embodiments of the neural network system of FIG. 1.
Figure 4A:
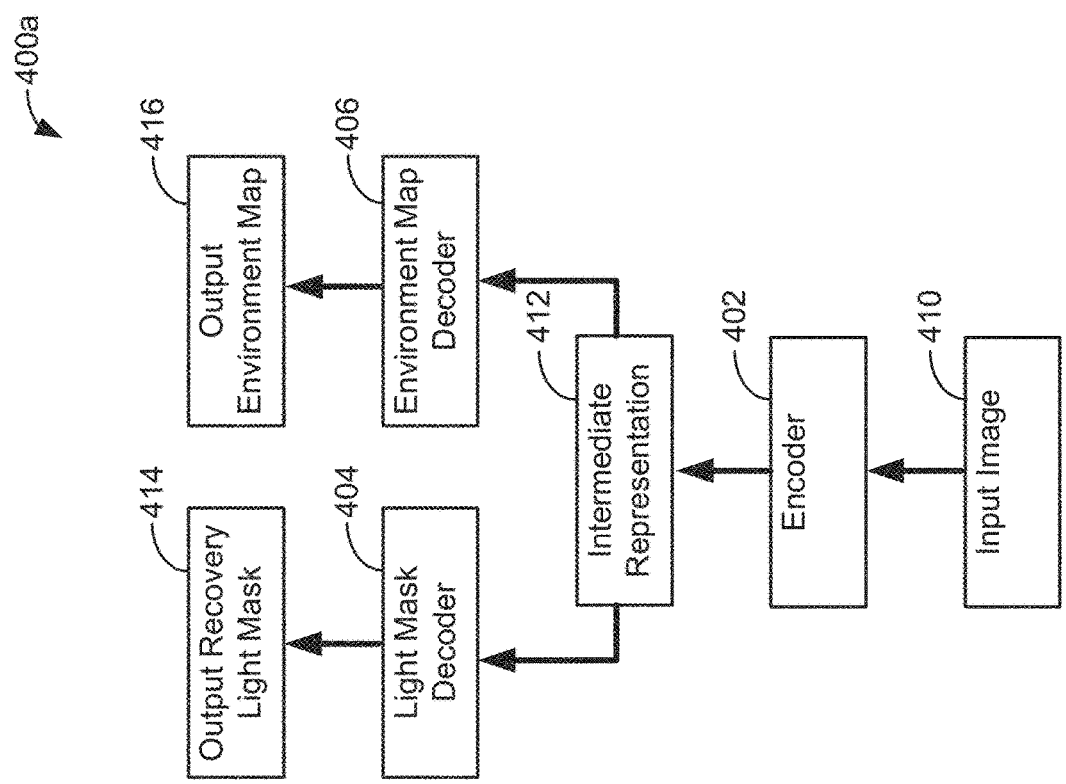

Turning to FIG. 4a, an illustrative architecture for a neural network system 400a used for estimating illumination after a first training phase is shown. The neural network system 400a includes an encoder 402, a light mask decoder 404, and an environment map decoder 406. One or more of the encoder 402, light mask decoder 404, and environment map decoder 406 may each include a separate network, such as a neural network. For example, the light mask decoder 404 may include a light mask neural network, and the environment map decoder 406 may include an environment map neural network.

The encoder 402 encodes an input image 410, such as a standard RGB image representing an LDR image (e.g., a training patch generated from the LDR training set 322 or, in some implementations, a training patch generated from the HDR training set 324) or an HDR image (e.g., a training patch generated from the HDR training set 324 or another HDR image), to an intermediate representation 412. The intermediate representation 412 includes information that represents the input image 410 in a form other than the format the image is input into the neural network system 400. Accordingly, the intermediate representation 412 is a translation of the input image 410. In some aspects, the intermediate representation 412 includes approximately 1024 floating point values. The floating point values are formulaic representations representing real numbers indicating color and/or brightness information for each pixel within the input image 410. Although not depicted in FIG. 4, the neural network system 400 may also receive surface normal values for input image 410 as input in addition to the input image 410 itself. The surface normal values may have been previously determined for each pixel within input image 410 so as to indicate geometry of objects.

Subsequent to the encoder 402, the neural network system 400*a* separates into two branches: the light mask decoder 404 representing one branch and the environment map decoder 406 representing the other branch. The light mask decoder 404 and the environment map decoder 406 may both operate from the same intermediate representation but perform different operations to provide different outputs. In this way, the decoders 404 and 406 may be considered two independent tasks that together generate a realistic environment map that provides an illumination estimation.

The light mask decoder 404 may use a series of deconvolution operations to generate an output recovery light mask 414. The output recovery light mask 414 represents a panoramic environment that includes but is larger than the input image 410 and indicates a probability of each pixel of the panoramic environment being a light source. As noted previously, an example recovery light mask 600 is shown in FIG. 6.

Figure 9:
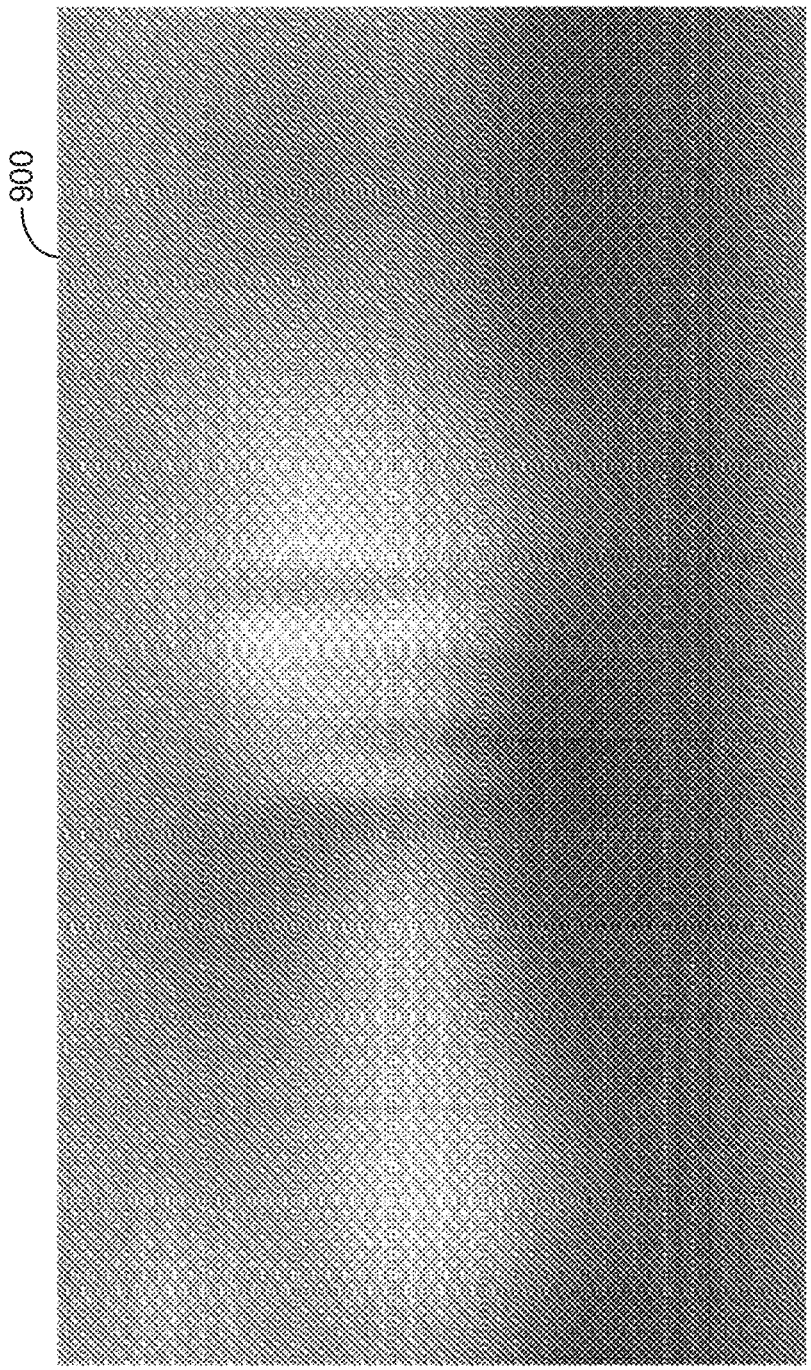
FIG. 9 is a schematic diagram of an example environment map, in accordance with implementations provided herein.

The environment map decoder 406 generates an output environment map 416. For example, the output environment map 416 may comprise an environment map that provides directional ambient color. For example, the environment map may be an LDR color image, in which colors are represented using RGB values. However, it should be understood that the output environment map 416 is not limited to RGB images and may be encoded using another color space/encoding. The output environment map 416 may be a low-frequency RGB image and may provide low-frequency ambient color information about the panoramic environment that includes input image 410. Such low-frequency information includes a coarse estimation of color distribution. This coarse estimation of color distribution indicates the general distribution of different colors around the panoramic environment without clear boundaries between different colors and items. An example environment map 900 is shown at FIG. 9. As FIG. 9 demonstrates, the output environment map may appear as a very blurry image, and such images may not illustrate definitive objects within the panoramic environment. But the output environment map may generally depict average colors distributed around the panoramic environment and semantic distinctions between walls, floors, ceilings, and the like. For example, if there is a brick wall, the output environment map may include an area with the low-frequency color, such as red, but may not depict the actual brick pattern. In this way, textures will not generally be shown in the output environment map.

Turning to FIG. 4*b*, an illustrative architecture for the neural network system 400*b* used for estimating illumination. The neural network system 400*b* is similar to the neural network system 400*b* except that the light mask decoder 404 that generates an output recovery light mask 414 is replaced by an intensity decoder 418 that generates an output light intensity map 420. The neural network system 400*b* may be representative of the neural network system 400*a* after completion of a second phase of training (e.g., training using HDR training data). The neural network system 400*b* is an example of the neural network system 116 that is used by the illumination estimator 114.

The intensity decoder 418 may use a series of subsequent deconvolution operations to generate the output light intensity map 420. The output light intensity map 420 represents a panoramic environment that includes but is larger than the input image 410 and indicates a light intensity value of each pixel of the panoramic environment. In some implementations, the light intensity value is represented using a logarithmic scale. As noted previously, an example light intensity map 800 is shown in FIG. 8.

In some implementations, at the beginning of the second phase of training, the output recovery light mask 414 generated by the light mask decoder 404 is treated as an output light intensity map 420 (i.e., the light probability values are treated as logarithmic intensity values) for purposes of training the neural network system 400*b*.

Table 1 below presents a detailed view of an example architecture of the neural network system 400*b*. In this example, a series of convolution layers, indicated as "Cony" or "Res" (when the convolution layer includes residual connections), generate a fully connected, indicated as "FC", layer as an intermediate representation. The intermediate representation segues into two heads, which are configured to reconstruct (decode) the output light intensity map and the output environment map from the intermediate representation. Each of the heads includes a series of deconvolution layers, indicated as "Deconv". Except for the output layers, the activation function is an exponential linear unit. The intensity decoder output layer uses a sigmoid activation function and the environment map output layer uses a hyperbolic tangent, indicated as "Tan h", activation function. In some implementations, such as the one described below in Table 1, there are no max-pooling layers. Instead, the image down-sampling is performed using a stride greater than 1 in at least some of the convolution layers. Example strides are indicated in parenthesis below. Further, in some aspects, batch normalization is performed after each layer except for the output layers. Additionally, in some aspects, dropout may be used to improve the generalization ability of the network (i.e., to prevent over fitting). For example, dropout at a rate of 0.3 may be performed on the fully connected layers. However, in other implementations, dropout is omitted to reduce the length of training times.

TABLE 1

| Stage | Description (Stride) |
| --- | --- |
| Input | HDR input |
| Encoder | Conv9-64 (2) |

TABLE 1-continued

| | |
|---|---|
| Encoder | Conv4-96 (2) |
| Encoder | Res3-96 (1) |
| Encoder | Res4-128 (1) |
| Encoder | Res4-192 (2) |
| Encoder | Res4-256 (2) |
| Intermediate Representation | FC-1024 |

| Stage | Description (Stride) | Stage | Description (Stride) |
|---|---|---|---|
| Intensity Decoder | FC-8192 | Environment Map Decoder | FC-6144 |
| Intensity Decoder | Deconv4-256 (2) | Environment Map Decoder | Deconv4-192 (2) |
| Intensity Decoder | Deconv4-128 (2) | Environment Map Decoder | Deconv4-128 (2) |
| Intensity Decoder | Deconv4-96 (2) | Environment Map Decoder | Deconv4-64 (2) |
| Intensity Decoder | Deconv4-64 (2) | Environment Map Decoder | Deconv4-32 (2) |
| Intensity Decoder | Deconv4-32 (2) | Environment Map Decoder | Deconv4-24 (2) |
| Intensity Decoder | Conv5-1 (1) | Environment Map Decoder | Conv5-3 (1) |
| Intensity Decoder | Sigmoid | Environment Map Decoder | Tanh |
| Intensity Decoder | Output Light Intensity Map | Environment Map Decoder | Output Environment Map |

Although the example neural network models shown in FIGS. 4a and 4b include two heads to decode a light mask or intensity map and an environment map from the intermediate representation, other implementations are possible too. For example, some implementations, include a third head to decode surface vector normal values from the intermediate representation. The third head can be trained on normal recovered from the panoramic images using traditional techniques. For example, during the training process a mean squared error function can be used as a loss function for the normal recovery head.

Figure 10:
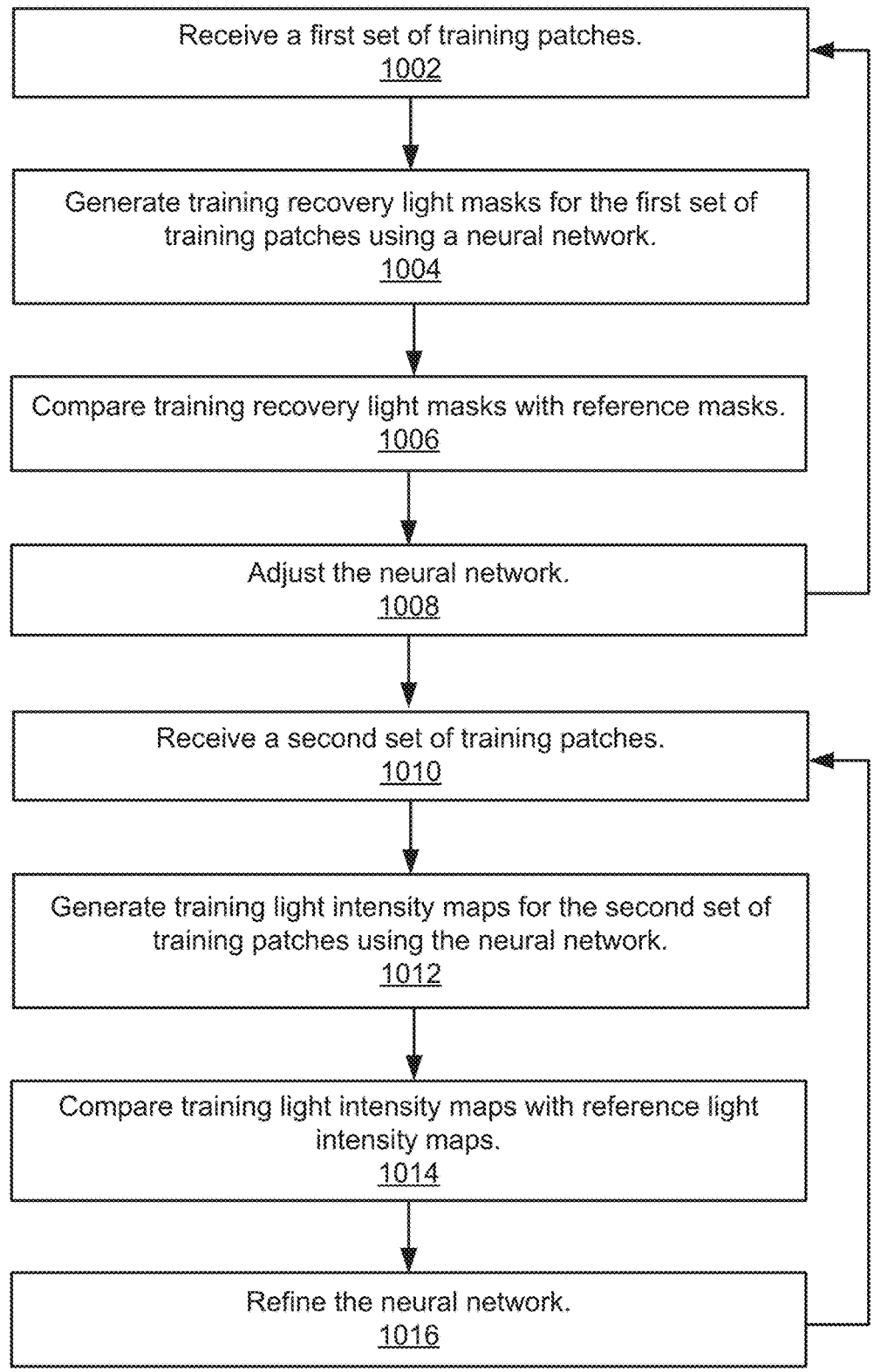
FIG. 10 is an example method for training a neural network to estimate illumination, in accordance with implementations provided herein.

Referring to FIG. 10, a method 1000 illustrates example operations of the system 100 of FIG. 1. The method 1000 may be used to train a neural network to estimate illumination of a panoramic environment from a single image. The method 1000 may be performed, for example, by the neural network training engine 128.

At operation 1002, a plurality of training panoramic images is received. These images may be received from a data store, such as data store 318 of FIG. 3, and/or from an image database stored in the cloud. The training panoramic images may each depict an indoor scene and comprise a 360-degree view of the scene. It is also contemplated, however, that the training panoramic images comprise an angle of view that is less than 360 degrees. For example, one or more of the training panoramic images may comprise a 180-degree view.

At operation 1002, a first set of training patches is received. These training patches may have been extracted from LDR training panoramic images by the training pair generator 302. The LDR training panoramic images may each depict an indoor scene and comprise a 360-degree view of the scene. It is also contemplated, however, that the LDR training panoramic images comprise an angle of view that is less than 360 degrees. For example, one or more of the training panoramic images may comprise a 180-degree view. Each training patch may comprise an angle of view that is less than the view of the training panoramic image from which the patch is extracted. For example, one or more training patches each comprising a 90-degree view may be extracted from a training panoramic image comprising a 360-degree angle of view. Where multiple patches are extracted from a single training panoramic image, the patches may have entirely distinct views of the scene or the patches may have views that are partially overlapping.

At operation 1004, a training recovery light mask is generated for each training patch using a neural network. The training recovery light mask represents the entire panoramic environment that includes the view depicted in the training patch and indicates a probability that each pixel within that panoramic environment is a light source. The probabilities of being a light source represented in the training recovery light masks may be stored as a numerical value or may be color coded such that different colors represent a different probability or a different range of probabilities.

In some embodiments, a training environment map may also be generated for each training patch using a neural network. Like the training recovery light mask, the training environment map represents the entire panoramic environment and may indicate a coarse estimate of color distribution for that environment. The neural network used to generate the environment maps may be part of the same neural network system as the neural network used for generating the training recovery light masks.

The training recovery light mask and, in some aspects, the training environment maps may be generated by a neural network model such as the neural network model 310. Specifically, a training input image may be encoded into an intermediate representation. In some aspects, the intermediate representation is 1024 floating point values. From the intermediate representation, the training recovery light mask and, in some aspects, the training environment maps are generated. Although they both start from the same intermediate representation, the processes of generating the training recovery light mask and the training environment map from that intermediate representation may be independent of each other.

At operation 1006, the training recovery light masks are compared with reference masks. A reference mask may include a binary light mask created for the training panoramic image from which the patch used to create the training recovery light mask was created. In some aspects, the reference mask is created using a first SVM classifier to identify small light sources and a second SVM classifier to identify large light sources.

The reference mask may indicate whether each pixel within the panoramic environment has been classified as a light source or not a light source. Similarly, in aspects in which training environment maps are generated, the training environment maps are compared to reference images. The reference image may be the training panoramic image from which the patch used to create the training environment map was extracted.

These comparisons may include determining one or more loss function types. For example, the comparison between a training light recovery mask and a reference mask may include determining binary cross-entropy as a loss function, and the comparison between a training environment map and a reference image may include determining a L2 loss. It is contemplated that other types of loss functions may be used including, for instance, an adversarial term, an L3/L4/Ln loss, a masked loss, a render loss, and the like. In some aspects, for example, both an L2 loss and an adversarial loss are determined for the training environment map. In some implementations, the loss function is based on comparing the output of rendering a sphere using the reference mask and the recovery light mask. Additionally, over the course of training, the properties of the sphere may be adjusted. For example, the sphere may initially be highly diffuse (matte) and over time, the sphere may become more specular (shiny). This process may allow the network to bootstrap itself with a blurry error function that then becomes as the sphere becomes more reflective.

At operation 1008, the neural network may be adjusted based on the comparisons of the training recovery light masks to the reference masks. These adjustments may be based on the loss functions determined from comparing the training recovery light masks to the reference masks. Errors determined using loss functions may reduce the loss in the neural network system in future iterations. In some implementations, a neural network for generating environment maps is similarly adjusted based on the comparisons of training environment maps and reference images.

Operations 1002-1008 may be repeated any number of times to train the neural network system by using different LDR training panoramas and corresponding reference information, such as reference masks and reference images. For example, the method may be performed 100 times (i.e., for 100 epochs) to train the neural network. The training method used to train the neural network may include gradient descent, Adam optimizer, and the like.

At operation 1010, a second set of training patches is received. These training patches may have been extracted from HDR training panoramic images by the training pair generator 302. The second set of training patches and HDR training panoramic images may be similar to the first set of training patches and LDR training panoramic images, except that the HDR training panoramic images include HDR information. In at least some implementations, the second set of training patches are extracted from the HDR training panoramic images and are converted to an LDR format.

At operation 1012, a training light intensity map is generated for each training patch using the neural network. The light intensity map represents the entire panoramic environment that includes the view depicted in the training patch and indicates the intensity of light emanating from each pixel within that panoramic environment. In some implementations, the light mask output by the neural network trained in operations 1002-1008 is used as the training light intensity map. The values of the recovery light mask are treated as log intensity values rather than probability values, however. As discussed above with respect to operation 1004, a training environment map may also be generated for each training patch using a neural network.

At operation 1014, the training light intensity maps are compared with reference light intensity maps. A reference light intensity map may include a logarithmic value corresponding to the light intensity for the training HDR panoramic image from which the patch used to create the training light intensity map was created. For example, the reference light intensity may simply be the light intensity values stored in the HDR panoramic image. Similarly, in aspects in which training environment maps are generated, the training environment maps are compared to reference images.

The comparison of the training light intensity map may include determining one or more loss function types. The loss functions may be similar to those described with respect to operation 1006. In some implementations, an additional L2 loss function is used on the light intensity map output to avoid artifacts.

At operation 1016, the neural network may be refined based on the comparisons of the training light intensity maps to the reference light intensity maps (e.g., based on the aforementioned loss functions). Errors determined using loss functions may reduce the loss in the neural network system in future iterations. In some implementations, a neural network for generating environment maps is similarly adjusted based on the comparisons of training environment maps and reference images.

Operations 1010-1016 may be repeated any number of times to train the neural network system by using different HDR training panoramas and corresponding reference information, such as reference light intensity maps and reference images. For example, the method may be performed 100 times (i.e., for 100 epochs) to train the neural network. The training method used to train the neural network may include gradient descent, Adam optimizer, and the like.

Figure 11:
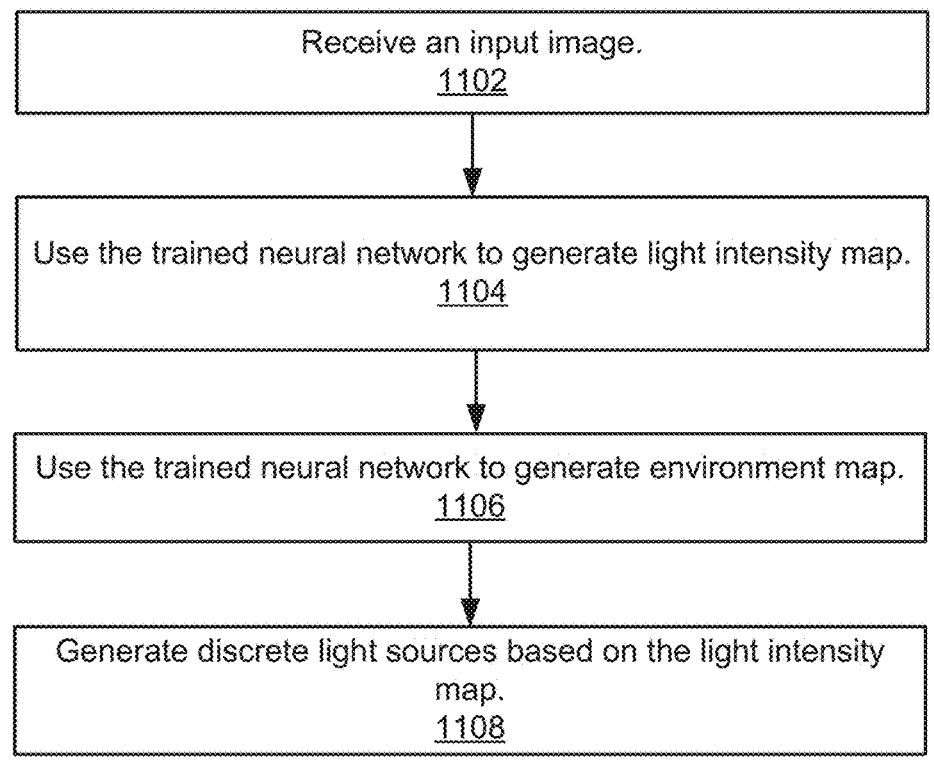
FIG. 11 is an example method for estimating illumination intensity from a single image, in accordance with implementations provided herein.

Referring to FIG. 11, a method 1100 illustrates example operations of the system 100 of FIG. 1. The method 1100 may be used to estimate illumination intensity from a single image. The method 1100 may be performed, for example, by the illumination estimator 114.

At operation 1102, an input image is received. The input image may depict an indoor scene and may include at least one of a wall, a floor, or a ceiling. The input image may have an angle of view of 100 degrees or less. The input image may be received from a memory device, another computer via a network, or from a camera device. The input image may, for example, be an LDR image.

At operation 1104, a trained neural network system is used to generate a light intensity map for the input image. The neural network system may be trained in accordance with the method 1000 illustrated in FIG. 10. The light intensity map, such as the light intensity map 800 shown in FIG. 8, for the input image indicates the estimated intensity of light emanating from each pixel within a panoramic environment. The panoramic environment is one that encompasses the view depicted in the input image and, unlike with the training input images, the panoramic environment is not necessarily known or depicted in another image available to the neural network system.

At operation 1106, the trained neural network system may be used to generate an environment map, such as the environment map 900 of FIG. 9, from the input image. The environment map may indicate low-frequency information for the panoramic environment encompassing the input image. Such low-frequency information includes a coarse estimation of color distribution.

The light intensity map and the environment map may be generated by a neural network system having an architecture similar to the neural network system 400b of FIG. 4b. For example, the input image may be run through an encoder network to encode the input image to an intermediate representation of, for example, 1024 floating point values. From that intermediate representation, an intensity decoder network may create the light intensity map while an environment map decoder network may create the environment map.

In some implementations, the light intensity map may be adjusted to fit a desired distribution. For example, a differentiable loss/regularizer function may be applied to adjust the values of each pixel in the output light intensity map. In some implementations, a histogram equalization technique may be used. Additionally or alternatively, a function that regularizes the first order derivative in one or more directions may be used as well.

The light intensity map and environment map may then be provided for display to a user (e.g., via the display window 126). Additionally or alternatively, the light intensity map and environment map may be used to automatically adjust the illumination of all or a portion of an image. The image being adjusted may include the input image, a copy of the input image, or another image or digital file. For example, when a user is compositing an object into the input image, the light intensity map and environment map for the original input image may be used to automatically adjust the illumination of the inserted content within the composited image to achieve a realistic appearance.

Additionally, in some implementations the light intensity map and possibly the environment map are used to generate discrete light sources at operation 1108. As described above, an adaptive thresholding operator may be applied to the light intensity maps. The environment map may be used to estimate colors for the discrete light sources. Additionally or alternatively, colors (e.g., of the discrete light sources or of the light intensity map) may be estimated by calculating a mean color of the input image. These discrete lights can then be used, for example, by a rendering engine.

Figure 12:
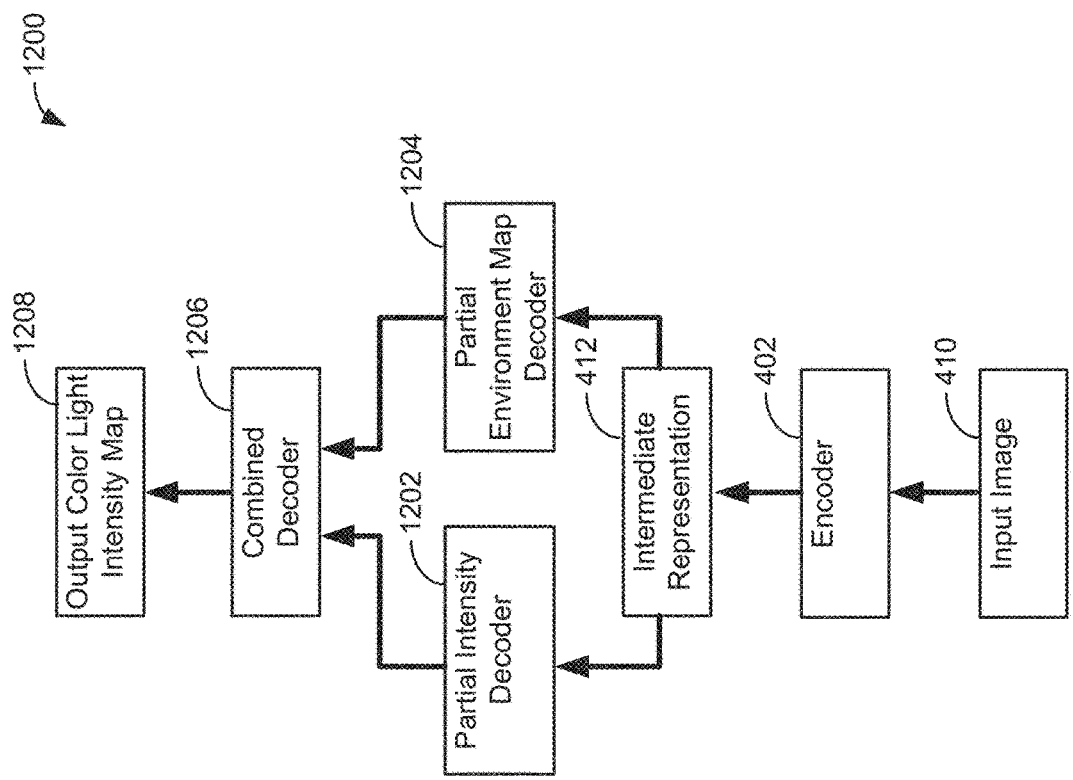
FIG. 12 is another schematic diagram of an embodiment of the neural network system of FIG. 1.

FIG. 12 shows another example illustrative architecture for a neural network system 1200 used for estimating illumination. The neural network system 1200 is similar to the neural network system 400b. For example, the neural network system 1200 includes the encoder 402 to encode an input image 410 to an intermediate representation 412.

The neural network system 1200 combines the intensity and color estimations into a single output. For example, the neural network system 1200 includes a partial intensity decoder 1202 and a partial environment map decoder 1204 that feed into a combined decoder 1206 to generate an output color light intensity map 1208. The partial intensity decoder 1202 may perform several upsampling steps to partially decode an intensity map from the intermediate representation. Similarly, the partial environment map decoder 1204 may perform several upsampling steps to partially decode an environment map from the intermediate representation. The partially decoded intensity map and the partially decoded environment map are then provided to the combined decoder, which may include additional layers for decoding a combined color intensity map.

In some implementations, the neural network system 1200 is used during the second phase of training (i.e., the HDR training), while a neural network system such as the neural network system 400a (shown in FIG. 4a) is used during the first phase of training (i.e., the LDR training). Beneficially, the neural network system 1200 simplifies the illumination estimation process because it is no longer necessary to perform post-processing operations to combine the light intensity map and environment map. Furthermore, because the top-most layers are merged, the memory requirements for the neural network system 1200 are reduced.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for estimating illumination, the system comprising:
at least one memory including instructions; and
at least one processor that is operably coupled to the at least one memory and that is arranged and configured to execute instructions that, when executed, cause the at least one processor to implement a neural network, the neural network comprising:
an encoder that is configured to encode an input image depicting at least a portion of a scene into an intermediate representation; and
an intensity decoder that is configured to decode the intermediate representation into an output light intensity map, wherein the light intensity map includes a pixel value corresponding to a location that is outside the portion of the scene depicted by the input image.

2. The system of claim 1, wherein the neural network is trained based on low dynamic range training images and refined based on high dynamic range training images, and
wherein a number of low dynamic range training images used to train the neural network is larger than a number of high dynamic range training images used to refine the neural network.

3. A system for estimating illumination, the system comprising: at least one memory including instructions; and
at least one processor that is operably coupled to the at least one memory and that is arranged and configured to execute instructions that, when executed, cause the at least one processor to implement a neural network, the neural network comprising:
an encoder that is configured to encode an input image depicting at least a portion of a scene into an intermediate representation; and
an intensity decoder that is configured to decode the intermediate representation into an output light intensity map,
wherein the neural network further comprises an environment map decoder configured to decode an output environment map from the intermediate representation.

4. The system of claim 1, wherein the neural network is trained based on low dynamic range training images, and wherein the low dynamic range training images include low dynamic range training panoramic images, and
wherein training of the neural network includes:
extracting a first set of training patches from the low dynamic range training panoramic images, each training patch of the first set of training patches being a portion of a low dynamic range training panoramic image;
generating training recovery light masks for the first set of training patches using a neural network system, each training recovery light mask indicating a probability of each pixel of a corresponding training panoramic image being a light source; and
based on comparisons of training light recovery masks to reference masks, training the neural network system to synthesize light recovery masks for input images.

5. The method of claim 4, wherein the reference masks are binary light masks generated from the training low dynamic range panoramic images.

6. The system of claim 4, wherein the neural network is refined based on high dynamic range training images, the high dynamic range training images including high dynamic range training panoramic images, and wherein refining the neural network includes:
extracting a second set of training patches from the high dynamic range training panoramic images, each training patch of the second set of training patches being generated from a portion of a high dynamic range training panoramic image;
generating training light intensity maps for the second set of training patches using the neural network system, each training light intensity map indicating an estimated light intensity of each pixel of a corresponding high dynamic range training panoramic image; and
based on comparisons of training light intensity maps to reference light intensity maps, training the neural network system to synthesize light intensity maps for input images.

7. The system of claim 6, wherein the reference light intensity maps include logarithmic intensity values from the high dynamic range training panoramic images.

8. A neural network for estimating illumination, the neural network comprising:
an encoder that is configured to encode an input image depicting at least a portion of a scene into an intermediate representation; and
an intensity decoder that is configured to decode the intermediate representation into an output light intensity map, wherein the light intensity map includes a pixel value corresponding to a location that is outside the portion of the scene depicted by the input image.

9. The neural network of claim 8, wherein the neural network further comprises an environment map decoder configured to decode an output environment map from the intermediate representation.

10. The system neural network of claim 8, wherein the intensity decoder is generated by a multi-phase training process that includes:
a first phase to train a light mask decoder using a set of low dynamic range images; and
a second phase to adjust parameters of the light mask decoder using a set of high dynamic range images to generate the intensity decoder.

11. The neural network of claim 10, wherein a number of low dynamic range images in the set of the low dynamic range images used in the first phase is larger than a number of high dynamic range images in the set of high dynamic range images used in the second phase.

12. The neural network of claim 8, wherein the neural network is further configured to generate a set of discrete light sources generated by applying an adaptive threshold operator to the output light intensity map.

* * * * *